(12) United States Patent
Kurtz et al.

(10) Patent No.: US 7,882,744 B2
(45) Date of Patent: Feb. 8, 2011

(54) FLAT PLANNER PRESSURE TRANSDUCER

(75) Inventors: Anthony D. Kurtz, Saddle River, NJ (US); Scott Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 101 days.

(21) Appl. No.: 12/386,096

(22) Filed: Apr. 14, 2009

(65) Prior Publication Data
US 2010/0257938 A1    Oct. 14, 2010

(51) Int. Cl.
*G01L 9/06* (2006.01)
(52) U.S. Cl. ......................................... 73/727
(58) Field of Classification Search ............... 73/727, 73/721, 726
See application file for complete search history.

(56) References Cited
U.S. PATENT DOCUMENTS

| | | | |
|---|---|---|---|
| 5,973,590 A | 10/1999 | Kurtz et al. | |
| 6,110,989 A | 8/2000 | Clarke | |
| 6,272,929 B1 | 8/2001 | Kurtz et al. | |
| 7,743,662 B2* | 6/2010 | Kurtz | 73/721 |
| 7,775,117 B2* | 8/2010 | Kurtz | 73/721 |

* cited by examiner

*Primary Examiner*—Jewel Thompson
(74) *Attorney, Agent, or Firm*—James E. Schutz, Esq.; Dean Y. Shahriari; Troutman Sanders LLP

(57) ABSTRACT

There is disclosed flat planar pressure transducer which comprises a planar insulative substrate of a rectangular configuration. Disposed on the substrate is an array of conductive areas which extend from a contact terminal area of said substrate to an end of the substrate. There is a leadless sensor module positioned at said contact terminal area, with the contacts of said leadless sensor contacting contact terminals of said contact terminal area. The leadless sensor is enclosed by an enclosure which is coupled to the substrate and surrounds the sensor. The enclosure has a screen positioned on the top surface to prevent particles from entering or damaging the leadless sensor. The above-noted structure forms a very flat, compact pressure transducer which can be utilized in lieu of flex circuit type devices and provides greater mechanical stability as well as a more accurate output.

20 Claims, 2 Drawing Sheets

FLAT PLANNER PRESSURE TRANSDUCER

FIELD OF THE INVENTION

This invention relates to pressure transducers and more particularly to a flat pack planar transducer structure.

BACKGROUND OF THE INVENTION

As one can ascertain, pressure transducers are used in many applications for measuring pressure in various environments. In any event, in certain applications it is extremely desirable that the pressure transducers have a very low profile and essentially have a configuration where it can be mounted on curved or other surfaces. In order to do this the transducer has to be relatively small and relatively flat. Such transducers exist in a prior art and used what is designated as flexible circuits. These flexible circuits essentially consist of metalized leads placed on a suitable plastic substrate. In this manner the substrate also contains a pressure transducer whereby the substrate can bend or curve and be placed on a curved surface creating a close contact and having a low profile. When employing such flex circuits, it has been determined that they are not stable as the plastic can change drastically according to temperature and so on. Therefore, these devices are not mechanically stable and present problems. It is therefore a desire of the present invention to provide an improved flat planar transducer structure which is very thin and which has increased stability and because of the nature of the structure, can be mounted on various surfaces, included arcuate surfaces without affecting the profile of the surface.

SUMMARY OF THE INVENTION

A pressure transducer, comprising: a planar insulative substrate member, an array of conductive areas extending from a contract terminal area of said substrate to an end of said substrate, where said areas at said contact terminal form conductive contacts, with each contact extending via an elongated path to said end of said substrate, a leadless sensor module having contacts, said sensor positioned at said contact terminal area of said substrate with the contacts of said leadless sensor contacting an associated conductive contract on said substrate, an enclosure coupled to said substrate and positioned to enclose said sensor.

DETAILED DESCRIPTION OF THE INVENTION

Figure 1:
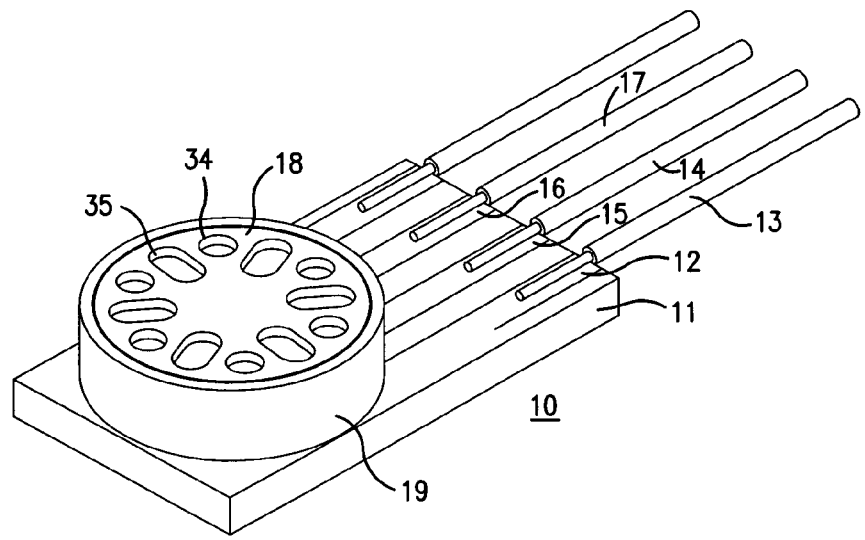
FIG. 1 is a perspective plan view of a transducer assembly according to this invention.

Referring to FIG. 1, there is shown a flat planar transducer assembly 10 according to this invention. A planar insulative member 11, which can be constructed from a suitable glass, such as a Pyrex glass and so on, acts as a mounting substrate for the planar transducer. On the glass substrate 11 is formed a layer of chromium by either sputtering or evaporating. The glass substrate 11 is covered with a substance such as photo-resist. The photo-resist acts as a mask for etching the chromium by any convenient means. The area in which the chromium is removed will form the channels on the glass substrate. Using the remaining chromium as a mask the glass substrate is etched forming a series of grooves. The glass substrate is etched using a mixture of hydrofluoric and nitric acid to a desired depth. After the glass pattern is etched to a sufficient depth the chromium is stripped. The glass is then covered with a layer of titanium and platinum. Then a second photo-resist mask is used to cover the glass substrate in such a way so that the titanium and platinum is etched away except in the grooves previously defined. Therefore, a series of conductive channels such as 12, 15 and 16 are formed. These conductive channels 12, 15 and 16 are all insulated one from another due to the glass substrate.

Figure 2:
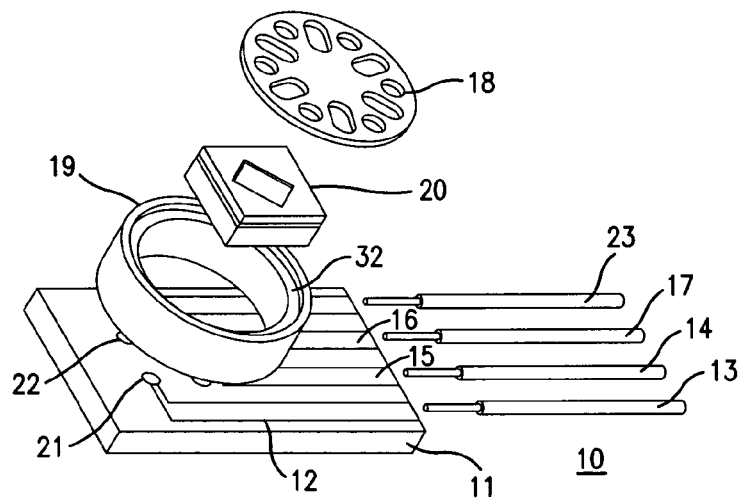
FIG. 2 is a exploded view depicting the parts utilized in the assembly of FIG. 1.
Figure 3:
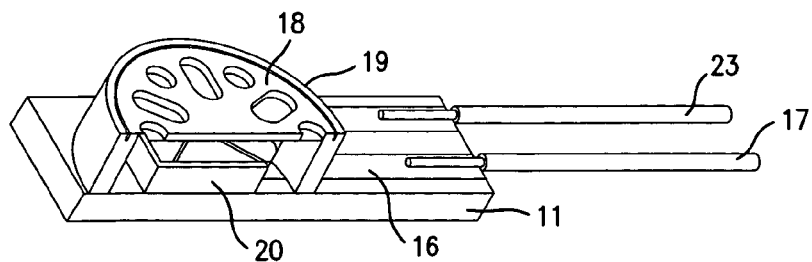
FIG. 3 is a cross-sectional view of the assembly of FIG. 1 for a clearer understanding of the invention.

Referring to FIG. 2, there is shown the exact nature of the conductive channels such as 12, 15 and 16. And as seen, channel 12 emanates in a contact area 21, channel 16 in the contact area 22 as do the other channels. These contact areas are positioned on the glass substrate 11 so that direct contact can be made to a leadless sensor device 20. The leadless sensor device 20 is a semiconductor device which essentially is devoid of leads but has suitable contacts. These contacts make contact with the contact areas 21 and 22 on the glass substrate and therefore enable contact to be made to the leadless semiconductor sensor 20. The leadless semiconductor sensor is secured to the glass substrate 11 by means of a glass bond or a glass-metal frit seal. Sealing of such devices are well known and glass-metal frits utilized for sealing semiconductor sensors to a glass substrate is also well known. In regard to the semiconductor sensor, more detail will be explained subsequently. In any event, the structure 20 is designated as a leadless semiconductor device. Such devices are manufactured by Kulite Semiconductor Products, Inc., the assignee herein. For examples of such devices see U.S. Pat. No. 5,973,590 issued on Oct. 26, 1999 to A. D. Kurtz, et al., an inventor herein. The patent is assigned to Kulite Semiconductor Products, Inc., the assignee herein and is entitled Ultra Thin Surface Mount Wafer Sensor Structures and Methods for Fabricating Same. See also U.S. Pat. No. 6,210,989 issued on Apr. 3, 2001 to A. D. Kurtz, et al., and assigned to the assignee herein. That patent is entitled Ultra Thin Surface Mount Wafer Sensor Structures and Methods for Fabricating Same. See also U.S. Pat. No. 6,272,929 issued Aug. 14, 2001 to A. D. Kurtz, et al., and entitled High Pressure Piezoresistive Transducer Suitable For Use In Hostile Environments. In any event, as indicated, the transducer assembly 20 is the assembly depicted in the above-noted patents, all of which are incorporated herein in their entirety. The sensor 20 is therefore a leadless sensor, is extremely thin and compact. As seen, there is a screen holder or a circular housing 19. The housing 19 has a peripheral flange 32 into which a screen member 18 is inserted. Screen member 18, as one can ascertain, has a plurality of apertures as 34 and 35. These apertures prevent particles from entering the housing and thus serves as a screen. As indicated, the pressure transducer can be employed in hostile environments. Such transducers may be utilized in wind tunnel applications or other uses to measure pressure and so on. Such wind tunnels or other hostile environments may carry relatively large particles which can impinge upon the semiconductor diaphragm and damage the same. Therefore, the screen, as shown 18, operates to prevent such particles from impinging on or otherwise damaging the transducer 20 assembly.

As seen in FIG. 1 and FIG. 2, the leads as 13, 14, 17 and 23 are directly connected to the terminals areas as 12, 15 and 16. This can be done by typical solder or other conventional bonding techniques.

Figure 4:
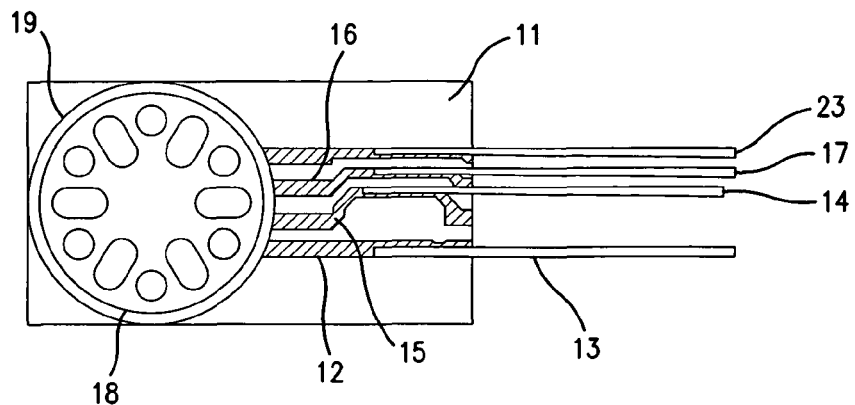
FIG. 4 is a top plan view of the planar pressure transducer according to this invention.

Referring to FIG. 4 there is shown a top-plan view of the sensor configuration depicted in FIG. 10. The same reference numerals have been utilized to designate the same parts. As seen, the substrate 11 is glass and has etched therein channels to accommodate the conductive metal areas as 12 and 15. The screen holder 19, as well as the screen 18, are depicted in FIG. 4.

Figure 5:
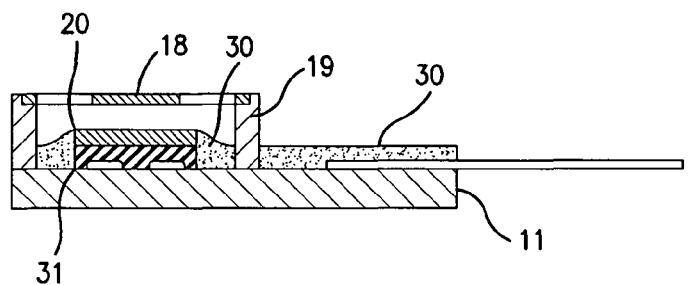
FIG. 5 is a cross-sectional view of the transducer assembly.

FIG. 5 is a cross-sectional view showing the sensor 20 configuration which is secured to the glass substrate 11 by means of a glass frit which can operate as a paste and which enables one to secure the semiconductor 20 to the substrate 11. In this manner, contact between the semiconductor contacts and the contact areas on the substrate such as areas 21 and 22 are facilitated.

Figure 6:
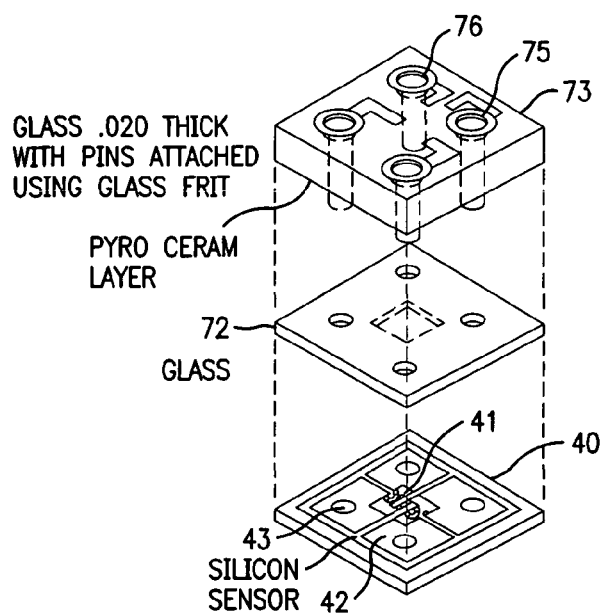
FIG. 6 is an exploded view showing the various parts utilized in a leadless sensor arrangement employed with the transducer according to this invention.

Referring to FIG. 6 there is shown a detailed depiction in exploded view of the leadless semiconductor structure 20 employed with the present invention. As one can ascertain, FIG. 6 is FIG. 7 of U.S. Pat. No. 6,210,989 as well as FIG. 7 of U.S. Pat. No. 5,973,590. While the patents have a detailed description of the structure depicted in FIG. 7 and while the above-noted patents are incorporated herein, a short description of the Figure will be given. As can be seen from FIG. 6, there is a semiconductor wafer 40, which wafer contains a piezoresistive array 41, which array is normally connected in a Wheatstone bridge arrangement. The array is coupled to contact areas 42, which contact areas enable contact to the semiconductor piezoresistor 41. There is shown a glass wafer 72 which is secured to the silicon wafer plus another glass contact wafer 73 which is a ceramic or glass and which enables contact to be made to the contact areas of the silicon sensor 40. The member 43 has apertures as 75 and 76 which can be filled with a conductive material to enable contact to be made with the contact areas on the silicon sensor wafer 40. This designation, as indicated, is a leadless semiconductor and which basically contains a semiconductor diaphragm having an oxide layer where one then fusion bonds P+ sensor elements to the oxide layer and then one fusion bonds the finger elements to the oxide layer and fabricates the device. As indicated, the construction of such devices is clearly depicted in the above-noted patents whereby one can determine the exact nature of the leadless semiconductor sensor 20 utilized in the planar transducer according to this invention.

One will ascertain, again referring to FIG. 5, that the final package can be coated or covered with a typical protective layer of epoxy or a potting compound and therefore fully protected from the environment. Thus, as indicated above, there is shown a flat planar pressure transducer which can be utilized in lieu of flex circuits and which provides a very thin and stable circuit. The typical dimensions of the glass substrate 11, would be approximately 0.125 inches in width and 0.225 inches in length. The thickness of the glass substrate 11 would be approximately 0.02 inches. The screen holder member 19 has a outer diameter of 0.125 inches with an inner diameter of 0.115 inches and a thickness of approximately 0.038 inches. In this manner as one can ascertain from the above-noted dimensions, the device is extremely small and can be positioned on various surfaces without disturbing the profile of the surface. Therefore, such devices as indicated can be used to measure pressure in wind tunnels and various other environments where there is a necessity to measure pressure with a minimal disturbance to the pressure profile. Thus, it will become apparent to one skilled in the art, that there are alternate embodiments and structures which may be perceived from reading the above-noted specification, all of which are deemed to be encompassed within the scope of the claims appended hereto.

What is claimed is:

1. A pressure transducer, comprising:
    a planar insulative substrate member,
    an array of conductive areas extending from a contract terminal area of said substrate to an end of said substrate, where said areas at said contact terminal area form conductive contacts, with each contact extending via an elongated path to said end of said substrate,
    a leadless sensor module having contacts, said sensor positioned at said contact terminal area of said substrate with the contacts of said leadless sensor contacting an associated conductive contract on said substrate,
    an enclosure coupled to said substrate and positioned to enclose said sensor.

2. The pressure transducer according to claim 1 wherein said insulative substrate is a glass substrate.

3. The pressure transducer according to claim 2, wherein said glass is pyrex.

4. The pressure transducer according to claim 1 wherein said array of conductive areas are channels formed in said substrate wherein each channel has a metal deposited therein to form a conductive area.

5. The pressure transducer according to claim 2 wherein said glass substrate is a rectangular substrate having a length greater than the width.

6. The pressure transducer according to claim 5 wherein said conductive area extends along the length of said substrate.

7. The pressure transducer according to claim 1 wherein said enclosure is a circular enclosure having an opened top and bottom, with said bottom secured to said substrate to encircle said leadless sensor.

8. The pressure transducer according to claim 7 further comprising a screen member having a plurality of apertures on a surface, said screen member secured to said enclosure to cover said opened top.

9. The pressure transducer according to claim 1 wherein said leadless sensor is a semiconductor sensor having an array of piezoresistive elements.

10. The pressure transducer according to claim 9 wherein said piezoresistive elements are P+ semiconductor elements.

11. The pressure transducer according to claim 10 wherein said array of piezoresistive elements form a Wheatstone bridge.

12. The pressure transducer according to claim 2 wherein said leadless sensor is secured to said substrate by a glass bond.

13. The pressure transducer according to claim 9 wherein said semiconductor is silicon.

14. The pressure transducer according to claim 13 wherein said silicon semiconductor has a silicon diaphragm which deflects upon application of a force thereto and with said array of piezoresistive elements positioned on said diaphragm.

15. A pressure transducer, comprising:
    a planar insulative substrate member having a plurality of contact channels formed on a surface of said insulative member, said contact channels extending from a contact area array on said insulative substrate to an end of said substrate, each channel associated with a separate contact area wherein said contact area form said array,
    a conductive material deposited in said channels and said contact areas to form a plurality of conductive paths, each path having an associated contact area and a conductive channel, a leadless sensor module having contacts, said sensor positioned at said contact area array of said substrate with said contacts of said sensor contacting an associated contact area, to enable connections to be made to said sensor module via said conductive channels, an enclosure coupled to said substrate and positioned to enclose said sensor.

16. The pressure transducer according to claim 15 further comprising:

a plurality of wires, each wire coupled to an associated channel for enabling contact with said sensor module.

17. The pressure transducer according to claim 15 wherein said insulative substrate is glass.

18. The pressure transducer according to claim 17 wherein said sensor module is secured to said substrate by a glass bond.

19. The pressure transducer according to claim 2 wherein said channels and contact areas are etched in to said glass substrate.

20. The pressure transducer according to claim 19 wherein said channels and contact areas are filled with a sputtered metal.

* * * * *